United States Patent
Keithley

(10) Patent No.: US 7,245,779 B2
(45) Date of Patent: Jul. 17, 2007

(54) IMAGE ENHANCEMENT EMPLOYING PARTIAL TEMPLATE MATCHING

(75) Inventor: Douglas Gene Keithley, Boise, ID (US)

(73) Assignee: Marvell International Technology Ltd. (BM)

( * ) Notice: Subject to any disclaimer, the term of this patent is extended or adjusted under 35 U.S.C. 154(b) by 764 days.

(21) Appl. No.: 10/625,971

(22) Filed: Jul. 23, 2003

(65) Prior Publication Data

US 2005/0018918 A1    Jan. 27, 2005

(51) Int. Cl.
G06K 9/40 (2006.01)
G06K 9/54 (2006.01)
H04N 1/407 (2006.01)

(52) U.S. Cl. .................. 382/254; 382/209; 382/305; 358/3.27

(58) Field of Classification Search ............. 382/205, 382/209, 217–221, 254, 266, 270, 274, 305, 382/312, 298–300; 345/613; 358/1.1, 1.2, 358/3.27

See application file for complete search history.

(56) References Cited

U.S. PATENT DOCUMENTS

| | | | |
|---|---|---|---|
| 4,437,122 A | 3/1984 | Walsh et al. | |
| 4,450,483 A | 5/1984 | Coviello | |
| 4,847,641 A | 7/1989 | Tung | |
| 5,014,330 A * | 5/1991 | Kobayashi et al. | 382/209 |
| 5,237,646 A * | 8/1993 | Bunce | 358/1.18 |
| 5,365,251 A | 11/1994 | Denber | |
| 5,966,507 A | 10/1999 | Lin | |
| 6,129,457 A * | 10/2000 | Thompson et al. | 358/1.2 |
| 6,178,011 B1 | 1/2001 | Lin et al. | |
| 6,181,438 B1 | 1/2001 | Bracco et al. | |
| 6,438,273 B1 | 8/2002 | Loce et al. | |
| 6,678,414 B1 | 1/2004 | Loce et al. | |
| 6,807,304 B2 * | 10/2004 | Loce et al. | 382/209 |
| 2002/0076107 A1 | 6/2002 | Loce et al. | |
| 2003/0002739 A1 | 1/2003 | Loce et al. | |

FOREIGN PATENT DOCUMENTS

EP    1 146 472 A2    10/2001

* cited by examiner

*Primary Examiner*—Kanjibhai Patel

(57) ABSTRACT

A method of image-resolution enhancement employing partial-template matching, including storing at least a portion of an image, and selecting from the image a window comprising a plurality of adjacent line segments having pixels, the window including a target pixel. The method also includes comparing the pixels of the window with a template for a partial match, and responsive to a partial match being found, substituting an enhancement pixel for the target pixel. By allowing a partial match for enhancement instead of requiring a 100-percent match of the prior art, the method provides image-resolution enhancement for digital-image data having noise or other errors.

22 Claims, 4 Drawing Sheets

|   | A | B | C | D | E |
|---|---|---|---|---|---|
| 5 | 0 | 1 | 1 | 1 | 0 |
| 4 | 0 | 1 | 1 | 0 | 0 |
| 3 | 1 | 1 | 0 | 0 | 0 |
| 2 | 1 | 1 | 0 | 0 | 0 |
| 1 | 1 | 0 | 0 | 0 | 0 |

WINDOW

FIG. 3A

MASK

|   |   |   |   |   |
|---|---|---|---|---|
|   | 1 | 1 |   |   |
|   | 1 | 1 | 1 |   |
| 1 | 1 | 1 | 1 |   |
|   | 1 | 1 | 1 |   |
|   |   | 1 | 1 |   |

FIG. 3B

PATTERN

|   |   |   |   |   |
|---|---|---|---|---|
|   | 1 | 0 |   |   |
|   | 1 | 1 | 0 |   |
| 1 | 1 | 1 | 0 |   |
|   | 1 | 1 | 0 |   |
|   |   | 1 | 0 |   |

FIG. 3C

MATCH

|   |   |   |   |   |
|---|---|---|---|---|
|   | Y | N |   |   |
|   | Y | Y | Y |   |
| Y | Y | Y | Y |   |
|   | Y | Y | Y |   |
|   |   | Y | Y |   |

FIG. 3D

IMAGE ENHANCEMENT EMPLOYING PARTIAL TEMPLATE MATCHING

BACKGROUND

Systems for handling numerous document and data formats are moving towards becoming integrated computerized systems where different devices are tied to one another to provide solutions to customers' needs. A key factor in such integrated systems is enabling an original document, chart, or image to be scanned, and then presented so that a person viewing the scanned item does not perceive any difference in quality relative to the original. Unfortunately, the scanning process can introduce noise and errors into the data representing the scanned image, resulting in a perceptible diminution in the output. Technology is needed for enhancing image data having scanning introduced noise and errors without requiring significant, additional components be added to the system.

Many computerized systems already include some resolution-enhancement technology for improving the quality of scanned and printed documents. Existing resolution-enhancement technologies employ resolution enhancement in the form of templates implemented in logic operations or look-up tables. The references cited below describe various methods, devices, and systems of image or resolution enhancement to enhance printed images and displays using components already incorporated into present integrated computer systems. Image enhancement presently may be used for resolution enhancement, appearance tuning, appearance matching, conversion to gray-scale (e.g., halftone descreening), image restoration, pattern detection and segmentation.

Existing image resolution-enhancement techniques perform a wide variety of digital document processing tasks using template-based image enhancement devices. Enhancement is commonly performed on monochrome and color images, as well as binary and continuous tone images. A typical image enhancement device includes template operators to enhance the images, which may be characterized as an operator or device that transforms one image into another image. The image enhancement device is formed of a number of imaging template operators, often referred to as templates. The templates typically comprise a mask, a pattern, and an enhancement pixel. The number of templates in an image enhancement device may vary between a small number of templates to thousands of templates. These templates may be, for example, stored in a look-up table and implemented using a look-up table formalism. Other equivalent formalisms, such as Boolean logic may be employed.

A raster is a one-dimensional array of image data, reflecting a single line of data across a single dimension, i.e., the length or the width, of the image. Further, each location, or "picture element," in an image may be called a "pixel." In an array defining an image in which each item of data has a value, each value indicating the properties of a location may be called a pixel value. Each pixel value is a bit in a binary form of an image, a gray-scale value in a gray-scale form of an image, or a set of color-spaced coordinates in a color-coordinate form of an image. The binary form, gray-scale form, and color-coordinate form are each arranged typically in a two-dimensional array of lines and columns, which defines the image.

Tung, C., "Piece-Wise Print Image Enhancement for Dot Matrix Printers," U.S. Pat. No. 4,847,641, Jul. 11, 1989; and U.S. Pat. No. 5,005,139, Apr. 2, 1991, describe resolution-enhancement methods and devices. Tung describes several types of printing errors that occur in printing characters and graphs using pixels, such as stepped edges instead of smooth edges, and omitted detail in sharp tips and circles (Cols. 7 and 8 of '641). Tung describes resolution-enhancement methods and devices in the prior art operable to smooth printed lines and curves, and fill in display errors by enhancing the resolution of pixels. In the prior art, an image-resolution-enhancement device uses templates to transform certain pixel patterns in a binary image into a corresponding enhanced pixel patterns by matching a template to the pixel patterns. Template matching is a binary-matching process whereby a binary template is applied to a binary image. An image consisting of lines in a binary form is sent to a data-buffering module. A binary-pattern-matching operation is performed using binary templates that are typically defined as possessing ones and zeros. After combining the buffered image data and the templates in the binary-pattern-matching operation, an output step substitutes an enhancement pixel for the target pixel when a 100-percent match is found to create the enhanced image. The image-resolution-enhancement process may be implemented in various ways, such as a Boolean logic module or a look-up table. In the Boolean logic representation, pixel values are used as variables in the logic architecture, such as a logical sum of products.

Specifically, referring to FIGS. 1 and 2, the image-enhancement device observes a pattern of pixels in a window defined by a selected template. FIGS. 1 and 2 illustrate certain aspects of the prior art for resolution-enhancement technology. FIG. 1 illustrates a 5×5 window comprising a plurality of bits representing pixels located about a target pixel, including pixels from the same line as the target pixel as well as pixels from at least one line above and at least one line below the target pixel (if available). A wide variety of types and sizes of windows are known. The window used in a particular application depends on the image to be analyzed and the particular process to be performed on the image. The 5×5 window illustrated in FIG. 1 includes five lines (1–5), and five columns (A–E), representing a 25-pixel block of binary-valued pixels of an image. One pixel in the window is the target pixel, which is typically the center pixel 3C, while the other pixels in the window are the neighboring pixels. The target pixel and the neighboring pixels form a neighborhood. The window is typically moved across the data representing an image, advancing from target pixel to target pixel.

FIGS. 2A–D illustrate conventional resolution-enhancement technology being applied to the target pixel 3C in a 5×5 window. FIG. 2A illustrates an example of the values and positions of pixels of a one-bit-per-pixel binary image in the 5×5 window. The "1"s represent pixels to be turned-on or displayed, and the "0"s represent pixels that are not to be turned-on. The image portion in the window of FIG. 2A could represent a two-pixel-wide line rising from left to right, such as a forward slash. The pixels in the window of FIG. 2A are inputted into a template-matching operation as discussed below.

FIG. 2B illustrates a mask portion of a template that establishes whether a particular pixel in a window is a pixel of interest. The mask illustrated in FIG. 2B may not include all the pixels in the window as pixels of interest. Rather the mask defines a pixel-bit subset of the window that may, but typically does not, include all the pixel bits in the window. FIG. 2C illustrates a pattern portion of a template that defines a "prediction-bit subset" that establishes the value each particular pixel of interest must have to be considered a match. That is, for a match to be found, all the pixels of FIG. 2A that are in the "1" positions of FIG. 2B must equal the respective pixels in FIG. 2C. FIG. 2D illustrates a match being found in the prior art when 100 percent of the pixels of interest (the pixel-bit subset of the window as defined by the mask of FIG. 2B) in FIG. 2A each have the required value as defined by the pattern (the prediction-bit subset) of FIG. 2C.

An image-enhancement device attempts to match the pixels of the window with one or more of templates. The template or another portion of the image-enhancement device includes an enhancement pixel to be substituted for the target pixel 3C when an exact match is found. If an exact match is found by comparing a pixel subset of the window with a prediction-bit subset, the image-enhancement device generates an appropriate output. The output may be an enhanced-pixel pattern for the target pixel that enhances the image. The image-enhancement device typically continues until all the templates have been applied to each target pixel, and all the target pixels have been enhanced (provided template matches have been found). In the example represented by FIGS. 2A–D, a match is found, and an enhancement pixel is substituted for the target pixel 3C to make the line look less jagged. Such an enhancement pixel may include a bit of toner added to target pixel 3C, or darkening only the upper left quadrant of target pixel 3C to smoothen the two-pixel wide line in the window of FIG. 2A. When a 100-percent match is not found, the conventional resolution-enhancement technology does not generate an enhancement and the value of the target pixel is not changed or enhanced.

The above described resolution-enhancement technology may not accurately provide resolution enhancement for scanned images because noise and errors in the scanned data often make the required 100-percent match unlikely. There is need for a method and apparatus using existing image-resolution-enhancement technologies to efficiently enhance digital-image data that may contain noise and errors, such as might be created in scanning a document. In view of the foregoing, there is a need in the art for a new and improved apparatus and method for resolution enhancement of images having noise and errors in their data.

SUMMARY

An aspect of the invention provides a method of image-resolution enhancement employing partial template matching. The method includes the steps of storing at least a portion of an image, and selecting from the image a window comprising a plurality of adjacent line segments having pixels, the window including a target pixel. The method also includes comparing the pixels of the window with a template for a partial match, and responsive to a partial match being found, substituting an enhancement pixel for the target pixel.

By allowing a partial match for enhancement instead of requiring the 100-percent match of the prior art, such a method provides image-resolution enhancement for digital-image data that may be mildly corrupted by noise or other errors.

BRIEF DESCRIPTION OF THE DRAWINGS

The invention, together with objects and advantages thereof, may best be understood by making reference to the following non-limiting description taken in conjunction with the accompanying drawings, in the several figures of which like referenced numerals identify like elements, and wherein:

FIG. 1 illustrates a conventional 5×5 window pixels located about a target pixel;

FIG. 2A illustrates the pixel values of a 5×5 window of an image;

FIG. 2B illustrates a mask portion of a template that establishes whether a particular pixel in the 5×5 window of FIG. 2A is a pixel of interest;

FIG. 2C illustrates a pattern portion of a template that defines a "prediction-bit subset" that establishes the value each particular pixel of interest must have to be considered a match;

FIG. 2D illustrates a match being found in the prior art when all of the pixels of interest (the pixel-bit subset of the window as defined by the mask of FIG. 2B) in the 5×5 window of FIG. 2A each have the required value as defined by the pattern (the prediction-bit subset) of FIG. 2C;

FIG. 3A illustrates values and position of pixels in a 5×5 window of an image similar to the window of FIG. 2A with an error in one of the pixel values according to an embodiment of the invention;

FIG. 3B illustrates a mask portion of a template that establishes whether a particular pixel in the 5×5 window of FIG. 3A is a pixel of interest, according to an embodiment of the invention;

FIG. 3C illustrates a pattern portion of a template that defines a "prediction-bit subset" that establishes the value each particular pixel of interest must have to be considered a match, according to an embodiment of the invention;

FIG. 3D illustrates an "N" representing a "no-match" status at pixel 5D of the 5×5 window of FIG. 3A because of the error in binary data, and an absence of a 100-percent match, according to an embodiment of the invention.

DETAILED DESCRIPTION

FIGS. 3A–D illustrate a method of image enhancement employing partial-template matching, according to an embodiment of the invention. The window of FIG. 3A represents a scan of a 5×5 portion of an image similar to the 5×5 image portion represented in the window of FIG. 2A, except that the scan was not perfect and introduced a data error at pixel 5D in the form of a "1" instead of a "0." The template represented by the mask of FIG. 3B and the pattern of FIG. 3C are the same as FIGS. 2B and 2C. Applying the mask and pattern of the template of FIGS. 3B and 3C to the window will not produce a 100-percent match because of the data error. FIG. 3D illustrates an "N" at pixel 5D representing a "no match" status. Under the prior art, because no match was found because the binary data was not perfect, no enhancement pixel is substituted for the target pixel 3C. Thus, as discussed above in conjunction with FIGS. 1–2D, the prior art leaves the image represented by the window of FIG. 3A without resolution enhancement.

One embodiment of the invention modifies the prior-art-resolution-enhancement technology to require only a partial match be found rather than a 100-percent match between the pixels of the window and the pattern for an enhancement pixel to be substituted for the target pixel. The degree of partial match may be selected to provide a desired degree of image-enhancement accuracy. For example, a partial match may be found if at least 90 percent of the bits of the pixel-bit subset of the window as defined by the mask of FIG. 3B equal the pixels of the prediction-bit subset as defined by the pattern of FIG. 3C. In an alternative embodiment, a partial match may be found if at least 80 percent of the bits of the pixel-bit subset compare with the prediction-bit subset.

For the window illustrated in FIG. 3A, a match for the purposes of enhancing the pixel 3C is found because 13/14=93 percent of the pixels of interest in the window of FIG. 3A match the pattern of FIG. 3C. Therefore, the pixel 3C is enhanced, for example, by darkening only its upper-left quadrant.

In a further embodiment of the invention, the comparing step can include assigning weights to each matched bit, and each matched bit is multiplied by the corresponding weight prior to determining if there is a match. For example, pixels further from the target pixel 3C could be weighted less.

Figure 4:
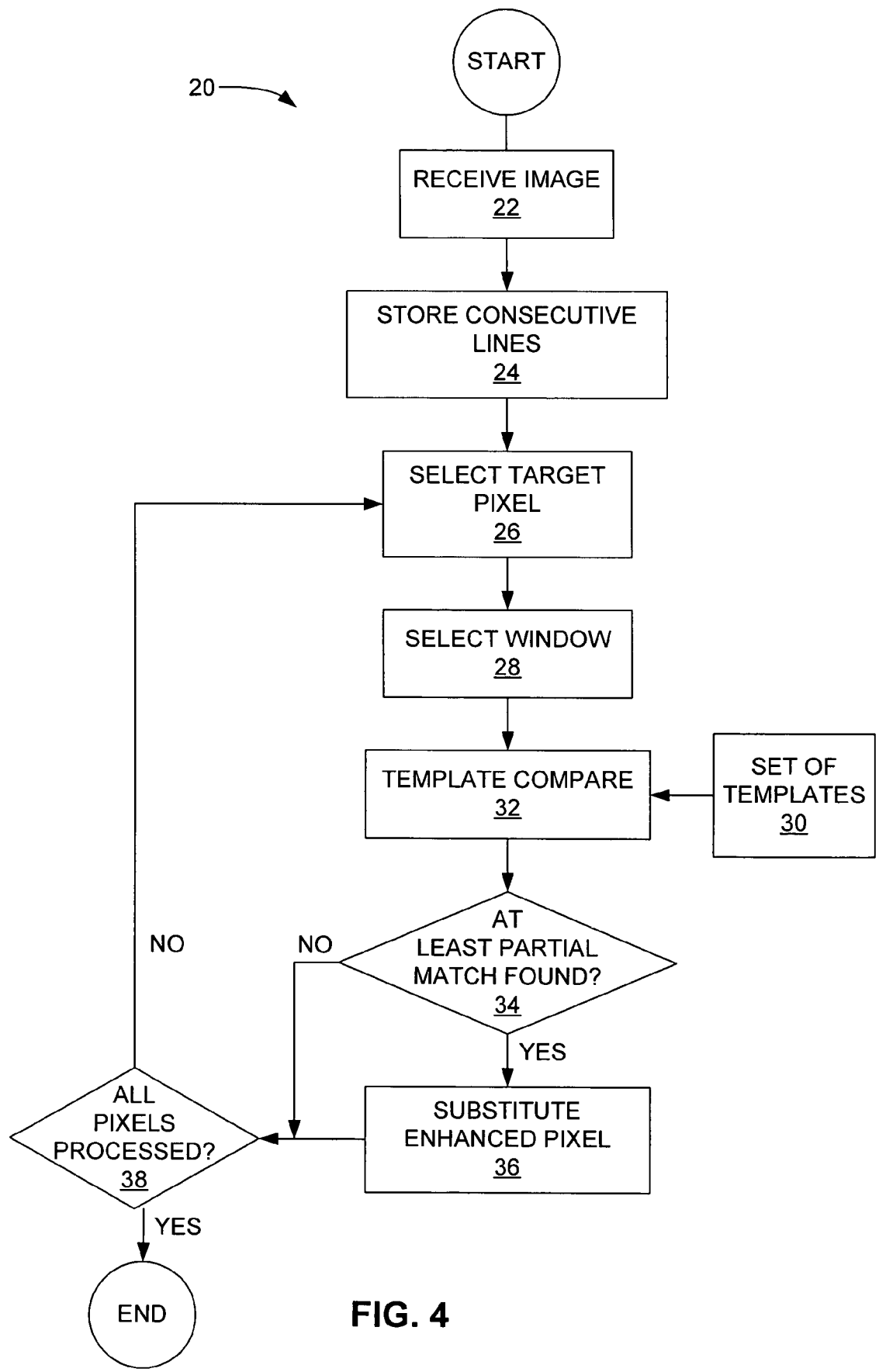
FIG. 4 is a flow chart of a method of image enhancement employing partial template matching, according to an embodiment of the invention.

FIG. 4 shows a flow chart 20 of a method of image enhancement employing partial-template matching according to an embodiment of the invention.

After a start, the flow begins at block 22 where the image for resolution enhancement is received, usually as pixel values in binary form.

Next, at block 24, at least a portion of the image for enhancement is stored in a memory or buffer module in a two-dimensional array of lines and columns.

The logical flow moves to block 26 where a target pixel from the image stored in memory is selected.

Proceeding to block 28, a window is selected comprising a plurality of line segments of bits representing pixels located about the target pixel, the window including pixels from the same line as the target pixel as well as pixels from at least one line above and at least one line below the target pixel, if available. The size and shape of the window depends on the image to be enhanced, and the particular enhancement process to be performed on the image.

The flow moves next to block 32 where the window comprising the plurality of line segments of bits representing pixels is compared with at least one template of the set of templates 30. The comparison may be performed in hardware, firmware, software, or a combination thereof. The comparison is performed as described in conjunction with FIGS. 3A–D.

The flow moves to decision block 34 where a determination is made whether a match was found. The degree of match may be determined as described in conjunction with FIG. 3.

If a partial match is found, the flow moves to block 36 where an enhancement pixel is substituted for the target pixel.

After block 36, the flow moves to decision block 38 to determine whether all the pixels of the image have been subjected to the resolution-enhancement process. If yes, the flow moves to the end block. If no, the flow moves back to block 26 and selects another target pixel for resolution enhancement.

If a partial match is not found at decision block 34, the flow moves to block 38. Upon completion of the flow of the resolution-enhancement method 20, all the pixels comprising the image have been processed and an enhancement pixel has been substituted in each instance where a partial match occurred.

One embodiment of the invention uses hardware including logic gates to implement the resolution-enhancement method 20. The hardware is operable at block 32 to compare a plurality of templates of the set of templates 30 to the selected window. Typically, the hardware would compare all of the templates of the set of templates 30 to the window at the same time. Multiple template matches may occur when simultaneously comparing templates. A priority scheme may be established for selecting which template constitutes the partial match and determines the enhancement pixel.

Another embodiment of the invention uses firmware and/or software to implement the resolution-enhancement method 20. In this embodiment, templates in the set of templates 30 are each assigned a priority. At the template-compare block 32, the templates are compared in order of priority, beginning with the highest priority. The first template that partially matches wins and determines the enhancement pixel.

Figure 5:
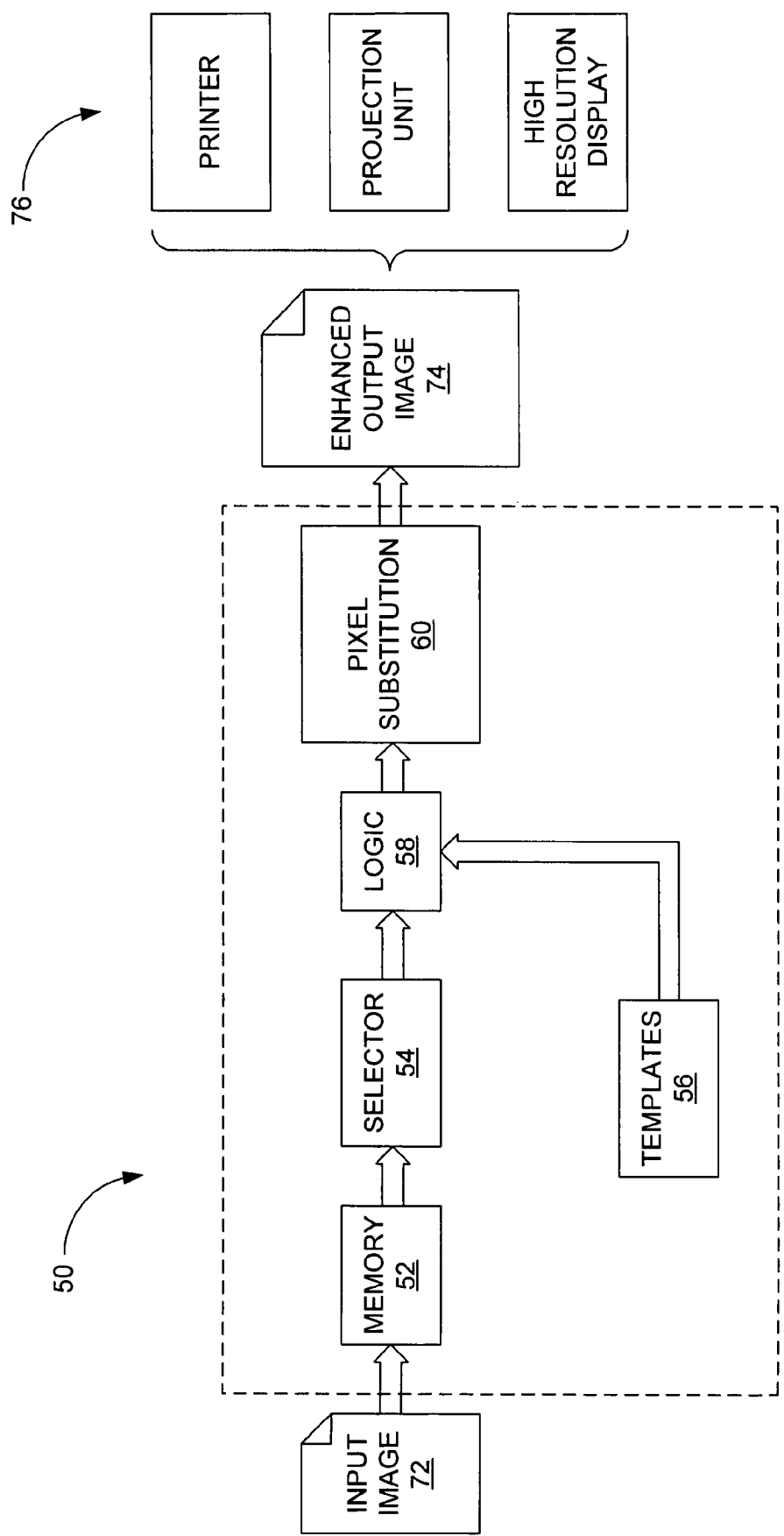
FIG. 5 is a diagram of a resolution-enhancing device, according to an embodiment of the invention.

FIG. 5 illustrates a diagram of a resolution-enhancing device 50 according to an embodiment of the invention. The resolution-enhancing device 50 includes a memory 52, a selector module 54, templates 56, a logic module 58, and a pixel-substitution module 60. The resolution-enhancing device 50 typically is incorporated into the rendering device, such as a printer or computer, or may stand-alone. Further, the elements of the resolution device may be distributed among several devices. For example, the memory 52 may be a part of a personal computer and the remainder of the device 50 may be a part of a printer.

The memory 52 can be any type of memory operable to store consecutive lines of an image being enhanced, and preferably is a fast semiconductor storage device. The selector module 54 may be any type of device operative to select from the image a window comprising a plurality of line segments of bits representing pixels, the window including a target pixel. The selector module 54 is operative to select a target pixel and select the window about the target pixel, as generally described in the prior art. The selector module 54 is further operative to sequentially select pixels in the image as a target pixel until all the pixels in the image have been selected. The templates 56 include a plurality of templates, as generally described in the prior art. Each template includes a mask, as illustrated in FIG. 2B, that establishes whether a particular pixel in a window is a pixel of interest, and a pattern illustrated in FIG. 2C that defines a "prediction-bit subset" that establishes the value each particular pixel of interest must have to be considered a match. The logic module 58 is operative to compare the pixels of the window with the templates 56, also as generally described in the prior art. However, and unlike the prior art, the logic module 58 is operative to find a partial match between the pixels of the window and a template of the templates 56. If a partial match is found with a plurality of templates, the logic module 58 may be further operative to apply a priority scheme to determine which template is used to substitute the enhanced pixel in response to the partial match. The pixel substitution module 60 is operative to substitute an enhancement pixel for the target pixel responsive to a partial match being found in the logic 58. The pixel-substitution module 60 may be a portion of the logic 58, but is illustrated here as a separate module for description of the function of substituting an enhancement pixel for the target pixel responsive to a partial match being found.

The resolution-enhancing device 50 typically is interposed between a source of an image to be rendered and the rendering device 76, the source typically being in pixel form. The resolution-enhancing device 50 receives the input image 72, performs the method 20 of image enhancement described in conjunction with FIG. 4, and provides an enhanced-image output 74 to a rendering device 76. The rendering device 76 typically includes a printer, but may be a selected one of a monitor, a projection unit, or a plotter. In other embodiments, partial template-matching functions may be implemented with firmware and/or with software on the user's host computer.

An embodiment of the invention can be implemented using an application specific integrated circuit (ASIC). The templates are stored and the matching occurs in the ASIC gates. The templates are described in hardware descriptive language and the code synthesized into a portion of the logic of the ASIC. In an alternative embodiment, some newer ASIC video blocks have several programmable table entries in addition to the fixed tables in hardware. These programmable table entries can be loaded by the printer's firmware from external ROMs into the ASIC tables. The tables are read directly by the hardware and the comparison is done at the same time as the built-in table matches.

The various embodiments of the invention may be implemented as interconnected machine-logic circuits or circuit modules and/or as a sequence of computer implemented steps or program modules running on a computing system. The implementation is a matter of choice dependent on the performance requirements of the system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

Although the present invention has been described in considerable detail with reference to certain preferred embodiments, other embodiments are possible. Therefore, the spirit or scope of the appended claims should not be limited to the description of the embodiments contained herein. It is intended that the invention resides in the claims hereinafter appended.

What is claimed is:

1. A method of image enhancement employing partial-template matching, the method comprising:
    storing consecutive lines of an image;
    selecting from the image a window comprising a plurality of line segments of bits representing pixels, the window including a target pixel;
    comparing a pixel-bit subset of the window as defined by a mask of a template with a prediction-bit subset as defined by a pattern of the template for a partial match;
    assigning weights to each matched bit identified during the comparison;
    multiplying each matched bit by its assigned weight pursuant to determining whether there is a partial match; and
    responsive to a partial match being found, substituting an enhancement pixel for the target pixel.

2. The method of claim 1, wherein the pixel-bit subset includes the target pixel.

3. The method of claim 1, wherein the pixel-bit subset further includes pixels from the same line as the target pixel as well as pixels from at least one line above and at least one line below the target pixel.

4. The method of claim 1, wherein the prediction-bit subset includes a designation of the pixel-bit subset for comparison.

5. The method of claim 1, wherein the template includes an enhancement pixel to be substituted for the target pixel when a partial match is found.

6. The method of claim 1, wherein the partial match is found if at least 90 percent of the bits of the pixel-bit subset compare with the prediction-bit subset.

7. The method of claim 1, wherein the partial match is found if at least 80 percent of the bits of the pixel-bit subset compare with the prediction-bit subset.

8. The method of claim 1, wherein the comparing comprises comparing a prediction-bit subset of a first template to a first pixel-bit subset of the window, and comparing a second prediction-bit subset of a second template to a second pixel-bit subset.

9. The method of claim 8, further comprising, if a partial match is found with a plurality of prediction-bit subsets, applying a priority scheme to determine which of the partially matched prediction-bit subsets is used to substitute the enhanced pixel in response to the partial match.

10. The method of claim 8, wherein the substitution comprises selectively modifying the target pixel based on a comparison of the target pixel and the target pixel determined by the matched prediction-bit subset.

11. The method of claim 1, further comprising:
    selecting at least one template from a plurality of templates, at least two of the templates of the plurality of templates being responsive to different errors in the target pixel, and each template including an enhancement pixel;
    wherein the comparing comprises comparing a pixel-bit subset of the window as defined by a mask of a template with a prediction-bit subset as defined by a pattern of the selected template for a partial match; and
    wherein, in response to a partial match being found with the selected template, the enhancement pixel of the selected template is substituted for the target pixel.

12. A method of image enhancement employing partial-template matching, the method comprising:
    storing consecutive lines of an image;
    selecting from the image a window comprising a plurality of line segments of bits representing pixels, the window including a target pixel;
    comparing a first prediction-bit subset of a first template to a first pixel-bit subset of the window for a partial match;
    comparing a second prediction-bit subset of a second template to a second pixel-bit subset of the window for a partial match; and
    responsive to a partial match being found with respect to the first and second prediction-bit subsets, applying a priority scheme to determine which of the partially matched prediction-bit subsets is used to substitute an enhancement pixel for the target pixel.

13. The method of claim 12, wherein at least one of the first or second pixel-bit subsets includes the target pixel.

14. The method of claim 12, wherein at least one of the first or second pixel-bit subsets includes pixels from the same line as the target pixel as well as pixels from at least one line above and at least one line below the target pixel.

15. The method of claim 12, wherein the first prediction-bit subset includes a designation of the first pixel-bit subset for comparison, and the second prediction-bit subset includes a designation of the second pixel-bit subset for comparison.

16. The method of claim 12, wherein each of the first and second templates include a respective enhancement pixel to be substituted for the target pixel when a partial match is found with the respective template.

17. The method of claim 12, wherein the first and second templates are responsive to different partial match errors for the target pixel.

18. A method of image enhancement employing partial-template matching, the method comprising:

storing consecutive lines of an image;

selecting from the image a window comprising a plurality of line segments of bits representing pixels, the window including a target pixel;

selecting at least one template from a plurality of templates, at least two of the templates of the plurality of templates corresponding to different partial match errors of the target pixel, and where each of the plurality of templates includes an enhancement pixel;

comparing a pixel-bit subset of the window with a prediction-bit subset of the at least one selected template for a partial match; and responsive to a partial match being found, substituting the enhancement pixel of the at least one selected template for the target pixel.

19. The method of claim 18, where a plurality of templates are selected for the partial match comparison.

20. The method of claim 19, further comprising, in response to a partial match with more than one of the plurality of templates, applying a priority scheme to determine which of the partially matched templates will be used for substituting the target pixel with the enhanced pixel.

21. The method of claim 18, where the pixel-bit subset includes the target pixel.

22. The method of claim 18, where the pixel-bit subset further includes pixels from the same line as the target pixel as well as pixels from at least one line above and at least one line below the target pixel.

* * * * *